United States Patent [19]

Takeno et al.

[11] 4,432,247
[45] Feb. 21, 1984

[54] LOAD CELL HAVING THIN FILM STRAIN GAUGES

[75] Inventors: Shozo Takeno, Yokohama; Koichiro Sakamoto, Mishima, both of Japan

[73] Assignee: Tokyo Electric Co., Tokyo, Japan

[21] Appl. No.: 323,726

[22] Filed: Nov. 23, 1981

[30] Foreign Application Priority Data

| Nov. 29, 1980 | [JP] | Japan | 55-0168533 |
| Nov. 29, 1980 | [JP] | Japan | 55-168534 |
| Dec. 2, 1980 | [JP] | Japan | 55-169854 |
| May 21, 1981 | [JP] | Japan | 56-77310 |
| May 27, 1981 | [JP] | Japan | 56-80602 |

[51] Int. Cl.³ .......................... G01L 1/22; G01B 7/20
[52] U.S. Cl. .................................. 73/862.67; 73/766; 73/776; 338/2
[58] Field of Search ................... 73/766, 776, 862.63, 73/862.67; 338/2

[56] References Cited

U.S. PATENT DOCUMENTS

| 2,662,957 | 12/1953 | Eisler | 338/2 |
| 4,188,258 | 2/1980 | Mounteer et al. | 338/2 X |
| 4,299,130 | 11/1981 | Koneval | 73/862.63 X |
| 4,329,878 | 5/1982 | Utner et al. | 73/862.67 X |

FOREIGN PATENT DOCUMENTS 1562139 3/1980 United Kingdom .

OTHER PUBLICATIONS

Bethe et al.–"Thin–Film strain–Gauge Transducers", Philips Tech. Rev. 39, No. 3/4, pp. 94–101 (1980).

Primary Examiner—Charles A. Ruehl
Attorney, Agent, or Firm—Frishauf, Holtz, Goodman and Woodward

[57] ABSTRACT

A load cell includes a bridge circuit having first to fourth strain gauge resistors and first and second temperature compensating resistors connected to the respective first and second strain gauge resistors. The first to fourth strain gauge resistors comprise a Nichrome layer formed on an insulating film, the first and second temperature compensating resistors each comprise a two-layered structure of the Nichrome layer and a titanium layer formed thereon, and connecting means for connecting the first to fourth strain gauge resistors and first and second temperature compensating resistors comprise a three-layered structure of the Nichrome layer and titanium layer and also a gold layer formed on the titanium layer.

14 Claims, 26 Drawing Figures

LOAD CELL HAVING THIN FILM STRAIN GAUGES

BACKGROUND OF THE INVENTION

This invention relates to load cells and method of manufacturing the same.

A load cell has a plurality of resistors formed on strain generating sections of a beam body, and a load applied to the beam body is measured by making use of the fact that the resistance of the resistor is changed according to the strain generated in the strain generating section at the time of the application of the load to the beam body. Hitherto, it has been a practice to form a load cell by bonding a metal foil of constantan, Nichrome, etc. to an insulating film of each material as polyimide or epoxy resin, appropriately etching the metal foil to form a resistor pattern to thereby form a load cell element and bonding the load cell element thus formed to the strain generating section of the beam body. This prior art method of manufacture of a load cell, however, requires a number of steps. Particularly, the step of bonding the load cell element to the beam body requires strict process control, and also its automation and mass production scale operation are difficult, thus giving rise to high cost. In addition, there is a lower limit of the thickness of the insulating film that can be obtained, so that it is difficult to permit strain generated in the strain generating section of the beam body to be transmitted with high efficiency to the resistors, thus leading to measurement errors. Further, while the resistor pattern is formed by the metal foil, it is difficult to form the metal foil sufficiently thin and obtain resistors having a high resistance. Consequently, high power is consumed at the time of the measurement, and this high power consumption is accompanied by high heat generation at the time of the measurement so that temperature compensation is called for.

SUMMARY OF THE INVENTION

An object of the invention is to provide a method of manufacture of a load cell, which is formed of a small number of steps and requires no strict process control.

Another object of the invention is to provide a load cell which consumes low power and has high precision.

In one mode of the invention, there is provided a load cell, which comprises a beam body, an insulating film formed on one surface of the beam body and a load cell element formed on the insulating film, the load cell element including first and second power source terminals, first and second output terminals, a first strain gauge resistor and a first bridge balancing resistor connected in series between the first power source terminal and first output terminal, a second strain gauge resistor and a second bridge balancing resistor connected in series between the first power source terminal and second output terminal, a third strain gauge resistor connected between the second power source terminal and first output terminal, and a fourth strain gauge resistor connected between the second power source terminal and second output terminal, a resistive layer being formed over a pattern region including the first to fourth strain gauge resistors, first and second bridge balancing resistors and connecting means for electrically connecting these resistors, and a conductive layer being formed on the resistive layer over a pattern of the connecting means.

According to the invention, the resistors of the bridge circuit comprise a single resistive layer, and the lead lines connecting these resistors comprise a conductive layer formed on the resistive layer. Thus, it is possible to obtain a load cell which is simple in construction and has high precision.

In another mode of the invention, there is provided a load cell, which comprises a beam body, an insulating film formed on one surface of the beam body and a load cell element formed on the insulating film, the load cell element including first and second power source terminals, first and second output terminals, a first strain gauge resistor and a first bridge balancing resistor connected in series between the first power source terminal and first output terminal, a second strain gauge resistor and a second bridge balancing resistor connected in series between the first power source terminal and second output terminal, a third strain gauge resistor connected between the second power source terminal and first output terminal, a fourth strain gauge resistor connected between the second power source terminal and second output terminal, and a temperature compensating resistor connected to one of the first and second power source terminals and having a positive temperature coefficient of resistance, a first resistive layer being formed over a pattern area including the first to fourth strain gauge resistors, first and second bridge balancing resistors, compensating resistor, and connecting means connecting these resistors, a second resistive layer having a low resistivity than the resistivity of the first resistive layer being formed over a pattern area including the temperature compensating resistor and connecting means, and a conductive layer being formed over a pattern area of the connecting means.

According to this mode of the invention, the first to fourth strain gauge resistors comprise the first resistive layer, the first temperature compensating resistor comprises the second resistive layer formed on the first resistive layer, and the connecting lines connecting these resistors comprise the conductive layer formed on the second resistive layer. In other words, the conductive layer and first resistive layer are electrically connected to each other not directly but through the second resistive layer. Thus, it is possible to obtain a load cell having a simple construction.

In a further mode of the invention, there is provided a method of manufacturing a load cell, which comprises a step of making smooth one surface of a beam body, a step of forming an insulating film on the smoothed surface, and a step of forming on the insulating film a load cell element including first and second power source terminals, first and second output terminals, a first strain gauge resistor and a first bridge balancing resistor connected in series between the first power source terminal and first output terminal, a second strain gauge resistor and a second bridge balancing resistor connected in series between the first power source terminal and second output terminal, a third strain gauge resistor connected between the second power source terminal and first output terminal, and a fourth strain gauge resistor connected between the second power source terminal and second output terminal, a resistive layer being formed over a pattern area including the first to fourth strain gauge resistors, first and second bridge balancing resistors and connecting means connecting these resistors, and a conductive layer being formed on the resistive layer over a pattern of the connecting means.

According to this mode of the invention, the resistors of the bridge circuit comprise a single resistive layer formed to have a predetermined pattern and are interconnected by a conductive layer formed on the resistive layer and having a predetermined pattern. Thus, it is possible to manufacture a load cell having a high precision through a simple manufacturing process.

DETAILED DESCRIPTION OF THE PREFERRED EMBODIMENTS

Figure 1:
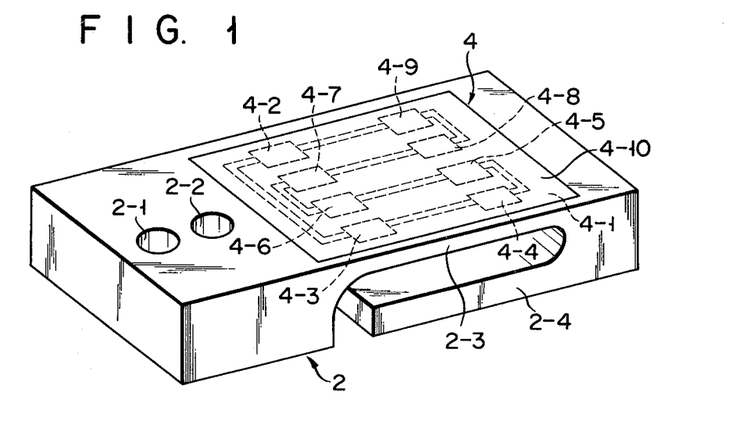
FIG. 1 is a schematic perspective view showing an embodiment of the load cell according to the invention.
Figure 2:
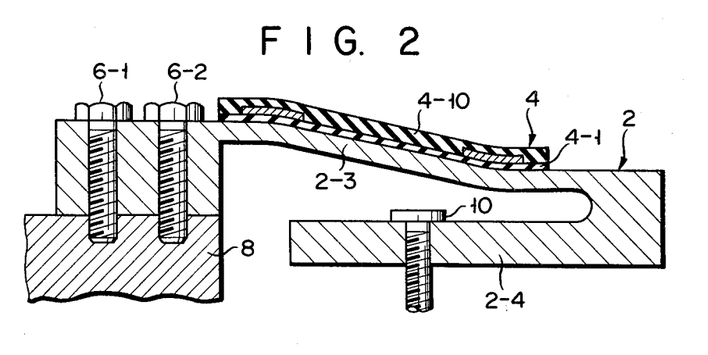
FIG. 2 is a sectional view of the same load cell in a state bearing a load applied.

FIG. 1 shows a schematic perspective view of one embodiment of the load cell according to the invention. This load cell includes a beam body 2, which is formed by cutting a metal material such as stainless steel (SUS630) or duralumin (A2014, A2024 or A2218), and a load cell element 4 formed on the beam body 2. The beam body 2 has mounting holes 2-1 and 2-2, in which two mounting bolts 6-1 and 6-2 for mounting the load cell at a stationary end portion thereof on a support base 8 as shown in FIG. 2 are inserted. The beam body 2 also has a thin strain generation portion 2-3 extending from the right side of the stationary end portion of the beam body and on which the load cell element 4 is formed, and a load bearing portion 2-4 extending from the movable end of the strain generating portion 2-3 back toward the stationary end portion. A support member 10 for supporting a sample weighing base (not shown), is mounted on the load bearing section 2-4. When a sample to be measured is placed on the sample weighing base, the strain bearing section 2-3 undergoes a great strain, more particularly a maximum extension strain in its portion near the stationary end portion and a maximum contraction strain in its portion near the movable end portion in FIG. 2.

Figure 3:
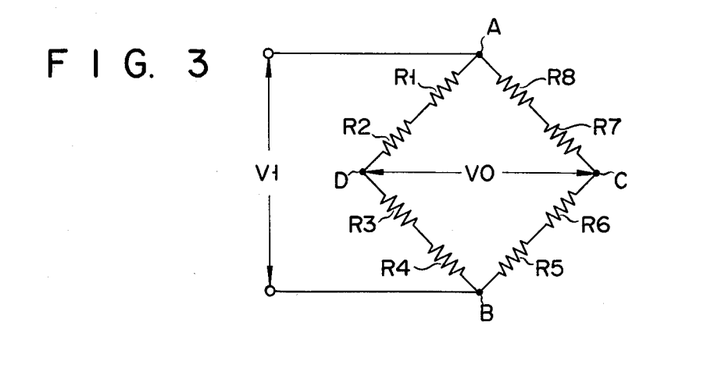
FIG. 3 is a circuit diagram showing an equivalent circuit of the load cell shown in FIG. 1.

The load element 4 includes an insulating film 4-1, which is formed on the strain bearing portion of the beam body 2 and formed of a heat-resistive insulating resin such as polyimide, polyamide-imide and epoxy modified polyimide, resistors 4-2 to 4-9 of an equal resistance formed on the insulating film 4-1 and connected to form a bridge circuit as shown in FIG. 3, and an insulating film 4-10 covering the resistors 4-2 to 4-9. In the bridge circuit shown in FIG. 3, resistors R1 to R8 correspond to the respective resistors 4-2 to 4-9 shown in FIG. 1. The resistors 4-2 to 4-9 are connected in series in the mentioned order by leads formed of a conductive layer such as gold layer. A pair of power source lines (not shown), between which an input voltage VI is applied, are connected to central portions of the two conductive connecting leads one connecting the resistors 4-2 and 4-5 and the other connecting the resistors 4-9 and 4-6 (corresponding to points A and B in the bridge circuit of FIG. 3), and two output lines (not shown) are connected to central portions of the two conductive connecting leads one connecting the resistors 4-1 and 4-7 and the other connecting the resistors 4-3 and 4-8 (corresponding to points C and D in the bridge circuit of FIG. 3). The resistors 4-2, 4-3, 4-6 and 4-7 are formed over the region of the beam body 2 that undergoes the maximum extension strain, while the resistors 4-4, 4-5, 4-8 and 4-9 are formed on the region of the beam body 2 that undergoes the maximum contraction strain. In other words, the resistors inserted in the opposing sides of the bridge circuit are formed in the same region. When a sample to be measured is placed on the sample weighing base, therefore, the resistors 4-2, 4-3, 4-6 and 4-7 experience an extension strain corresponding to the load, while the resistors 4-4, 4-5, 4-8 and 4-9 experience a contraction strain to an extent corresponding to the extension strain caused in the resistors 4-2, 4-3, 4-6 and 4-7. Thus, the bridge circuit gets out of the balanced state, and an output voltage VO corresponding to the load appears between the output terminals C and D.

Figure 4A:
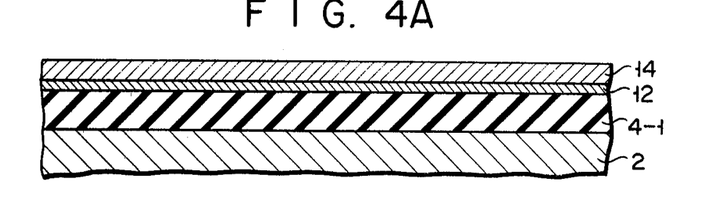
FIGS. 4A to 4E are sectional views illustrating a method of manufacture of the load cell shown in FIG. 1.

Now, the method of manufacturing the load cell shown in FIGS. 1 and 2 will be described with reference to FIGS. 4A and 4B.

In the first place, the surface of the strain generating section of the beam body 2 obtained by the cutting process is rinsed to remove fat, and varnish-like heat-resistant insulating resin, for instance polyimide, epoxy, polyamide-imide, epoxy-modified polyimide, etc. with a viscosity of 1,000 cp is dripped on the rinsed surface. Then, the beam body 2 is rotated with a spinner at a speed of 1,000 rpm to obtain uniform coating of the heat-resistant insulating resin over the surface of the beam body. The system is then heated to about 350° C. in a fluorine gas atmosphere, whereby the insulating resin is hardened to form a heat-resistant insulating film 4-1 with a thickness of about $6\mu$ over the surface of the strain bearing section. Subsequently, a metal having a high resistivity and a low temperature coefficient of resistance for forming resistors on the insulating film 4-1, for instance, Nichrome, constantan, etc., is deposited by such means as electron beam deposition or sputtering to form a resistive thin film 12 with a thickness of about 1,000 Å. Further, a metal layer 14 of gold or aluminum for forming leads is formed on the resistive thin film 12 to a thickness of about $2\mu$ by means of electron beam deposition or sputterning.

Figure 4B:
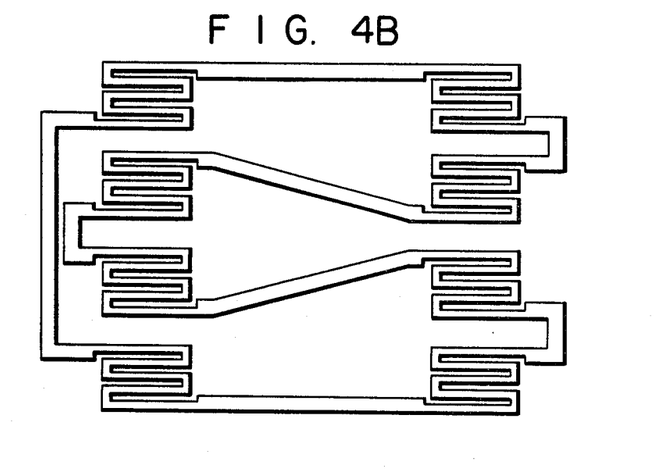

The metal layer 14 and resistive thin film 12 are then successively photo-etched with liquid etchants suited to the respective metals and also using a pattern defining the region where the leads and resistors are formed as shown in FIG. 4B. In this way, a two-layer pattern formed of the resistive thin film 12 and metal layer 14, is formed on the insulating layer 4-1.

Figure 4C:
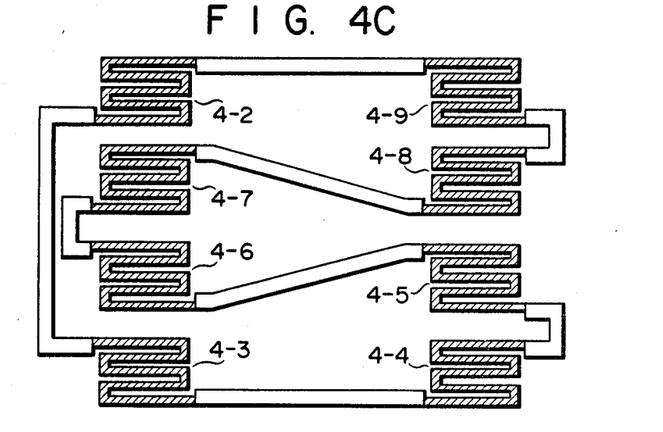

Thereafter, a portion of the metal layer 14 corresponding to the region of the resistors 4-2 to 4-9 is photo-etched as shown in FIG. 4C. Thus, the resistors 4-2 to 4-9 obtained are each formed of the single resistive thin film 12, while the conductive lead layers for connecting the resistors 4-2 to 4-9 in series each have a two-layer structure formed of the resistive thin film 12 and metal layer 14.

Figure 4D:
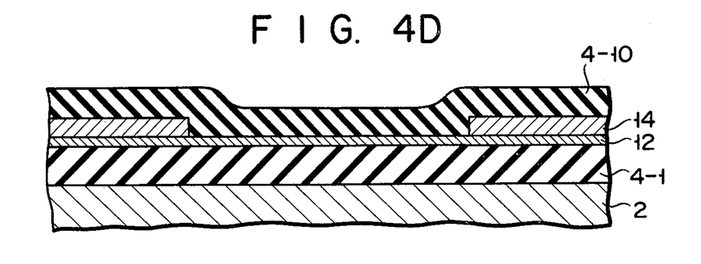

Afterwards, an insulating film 4-10 of a heat-resistant insulating resin is formed over the pattern of the resistors and leads as shown in FIG. 4D.

Figure 4E:
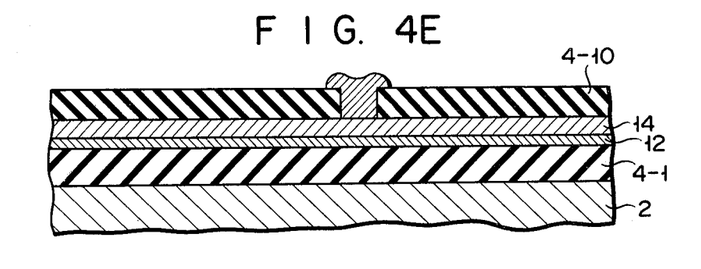

Finally, the insulating film 4-10 is selectively etched as shown in FIG. 4F to form electrode holes. These electrode holes are formed to expose a central portion of the conductive leads respectively connecting the resistors 4-2, 4-3, 4-6 and 4-7 to the resistors 4-9, 4-4, 4-5 and 4-8. Metal electrodes of aluminum, gold or the like are then formed in these electrode holes. The power source lines and output lines which are also made of aluminum, gold or the like are connected to these electrodes.

In the load cell obtained in this way, in which the conductive layers 12 are formed substantially on a flat surface, there is no possibility of breakage of the conductive layer caused by any stepped surface. In addition, since the resistors 4-2 to 4-9 are formed thinly on the insulating film 41, it is possible to obtain resistors of high resistance. Thus, it is possible to reduce power consumption and heat generation in the load cell at the time of the operation thereof and permit high precision measurement.

Figure 5:
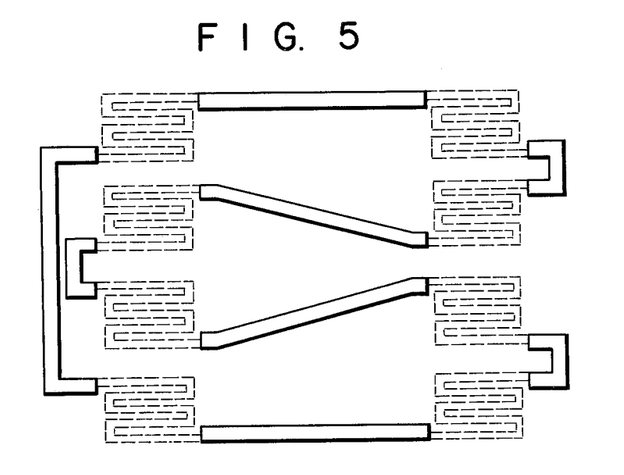
FIG. 5 is a view showing a different method of manufacture of the load cell shown in FIG. 1.

FIG. 5 shows a method of manufacture of a different embodiment of the load cell according to the invention. In this method, the metal film 14 of the structure shown in FIG. 4A is selectively etched to leave only the conductive layers as shown by solid lines, which are used to connect the resistors (shown by broken lines in FIG. 5) which are formed in the next step. The resistive film 12 is then selectively etched to leave the portions shown by the broken line in FIG. 5 and also portions underlying the conductive layers shown by the solid lines. In this way, the same structure as that of FIG. 4C can be obtained.

Figure 6:
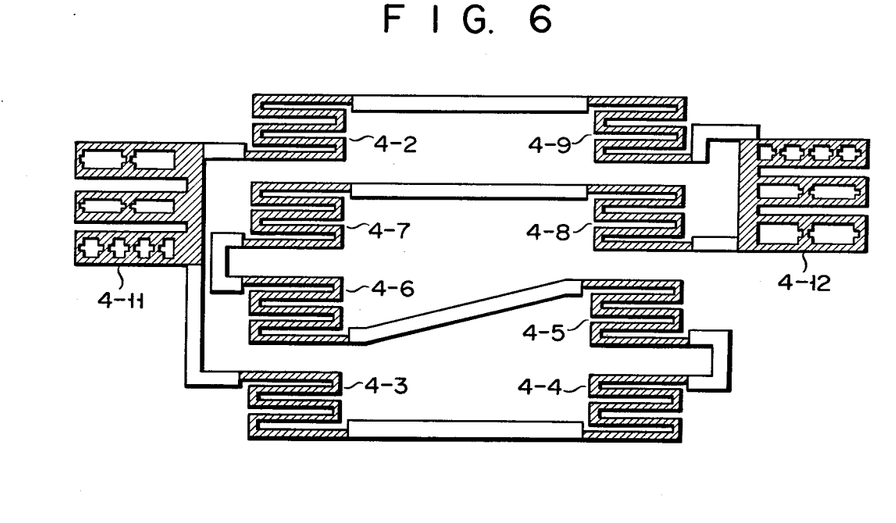
FIG. 6 is a view showing the layout of a different embodiment of the load cell according to the invention.
Figure 7:
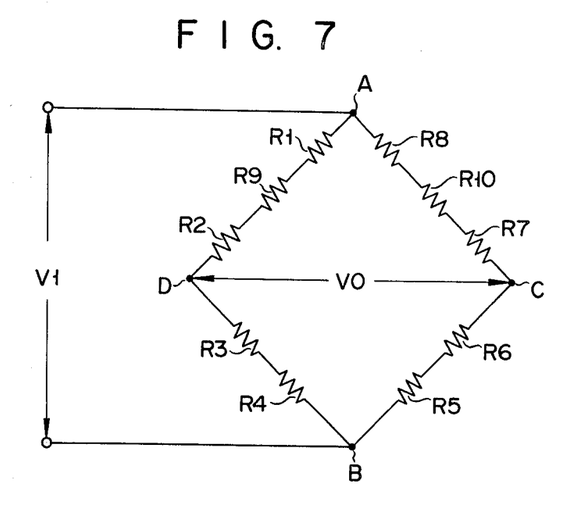
FIG. 7 is a circuit diagram showing an equivalent circuit of the load cell shown in FIG. 6.

FIG. 6 shows a load cell pattern in a further embodiment of the invention. In this load cell, a correction resistor 4-11 is connected between the resistors 4-2 and 4-3, and a correction resistor 4-12 is connected between the resistors 4-8 and 4-9, the rest being the same as the load cell shown in FIG. 4C. The correction resistors 4-11 and 4-12 each have a structure formed of a plurality of serially connected ladder-type resistor elements. More particularly, each ladder-type resistor element includes first and second resistive layers extending parallel to each other and a plurality of bypass resistive layers connected between the first and second resistive layers. The resistance of the ladder-type resistor element can be adjusted by selectively breaking the bypass resistors.

The correcting resistors 4-11 and 4-12 may be formed with the same material and by the same process as for the resistors 4-2 and 4-9. Also, they are formed on a portion of the beam body 2 that substantially undergoes no strain when a load is applied so that they would not be influenced by the strain produced in the beam body 2.

To establish the balanced state of the bridge circuit shown in FIG. 3, i.e., to meet a condition $$(R1+R2)(R5+R6)=(R3+R4)(R7+R8),$$

it is required to form the resistors 4-2 to 4-9 with a high precision. With the embodiment of FIG. 6, however, it is not necessary to form the resistors 4-2 to 4-9 with high precision, because the correction resistors 4-11 and 4-12 are ladder-type resistor elements, and the resistance thereof is adjustable. That is, in the equivalent circuit shown in FIG. 7 corresponding to the load cell of FIG. 6, the resistors R9 and R10 which correspond to the respective correction resistors 4-11 and 4-12 are variable, and thus the bridge circuit can be set to the balanced state by adjusting one or both of the resistors R9 and R10. These correction resistors 4-11 and 4-12 are formed, for instance, together with the resistors 4-2 to 4-9 in the step shown in FIG. 4C. Then, a bridge balance test is conducted, and the resistances of the correction resistors are adjusted on the basis of the data obtained as a result of the test.

Figure 8:
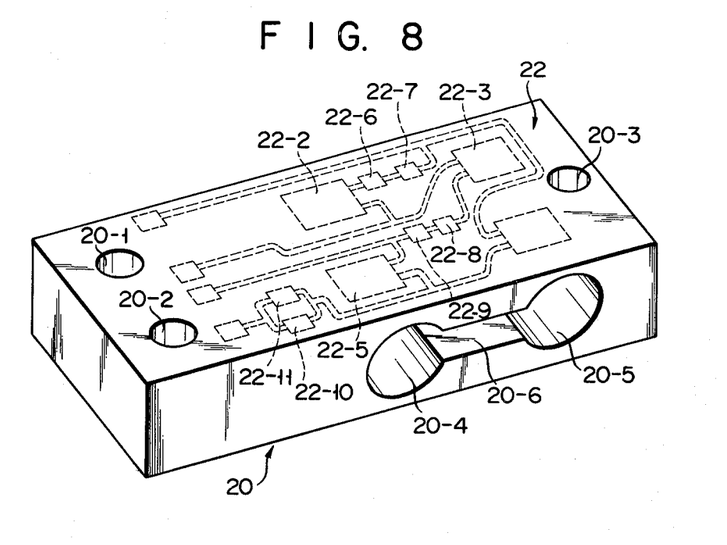
FIG. 8 is a schematic perspective view showing a further embodiment of the load cell according to the invention.
Figure 9:
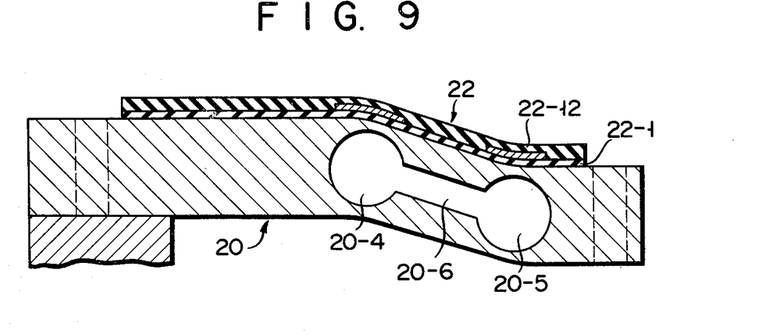
FIG. 9 is a sectional view showing the load cell of FIG. 8 when a load is applied.

FIG. 8 shows a schematic perspective view of a further embodiment of the load cell according to the invention. This load cell has a beam body 20 made of the same material as the aforementioned beam body 2 and a load cell element 22 formed on the beam body 20. The beam body 20 is formed in its stationary end portion with through holes 20-1 and 20-2, in which mounting screws for mounting the load cell on a support are received, and also in its movable end portion with a through hole 20-3, in which a mounting member for mounting a smaple base (not shown) is received. The beam body 20 further has transversally formed circular holes 20-4 and 20-5 communicated with each other by a transversal hole portion 20-6. With the beam body 20 secured as shown in FIG. 9 and with a load applied to the movable end portion of the beam body 20, the region over the through hole 20-4 is relatively extended while the region over the through hole 20-5 is relatively contracted.

The load cell 22, like the load cell shown in FIGS. 11 and 12, includes an insulating film 22-1 formed on the top surface of the beam body 20, resistors 22-2 to 22-11, and an insulating film 22-12 formed to cover the resistors 22-2 to 22-11. The resistors 22-2 to 22-5 are strain gauge resistors having substantially an equal resistance and formed of a material having a high resistivity and a low temperature coefficient of resistance, i.e., with the resistance changing little with changes in temperature. The resistor 22-2 has one end connected to one end of the resistor 22-3 and the other end connected through the resistor 22-6 serving as a bridge balancing resistor and the resistor 22-7 serving as a temperature compensation resistor to one end of the resistor 22-4. The other end of the resistor 22-3 is connected through the resistor 22-8 as bridge balancing resistor and resistor 22-9 as temperature compensation resistor to one end of the resistor 22-5. The other ends of the resistor 22-4 and 22-5 are connected to each other and also to temperature compensation resistor 22-10 and temperature characteristic compensation resistor 22-11 connected in parallel. The resistances of the bridge balancing resistors 22-6 and 22-8 can be adjusted like the bridge balancing resistors 4-11 and 4-12 shown in FIG. 6. The temperature compensation resistors 22-7 and 22-9 serve to compensate for temperature drift in the bridge balance. They are made of a metal such as titanium having a positive temperature coefficient of resistance. The temperature compensation resistors 22-7 and 22-9 also have a ladder-type structure for adjustment of the resistance. The temperature compensation resistor 22-10 serves to compensate for fluctuations of the output voltage (or span) due to temperature change, and is made of a metal such as titanium having a positive temperature coefficient of resistance. The temperature dependency of the output voltage mainly stems from the temperature dependency of the Young's modulus of the beam body 20. The temperature characteristic compensation resistor 22-10 for reliably compensating for the output voltage fluctuations due to temperature change.

Figure 10:
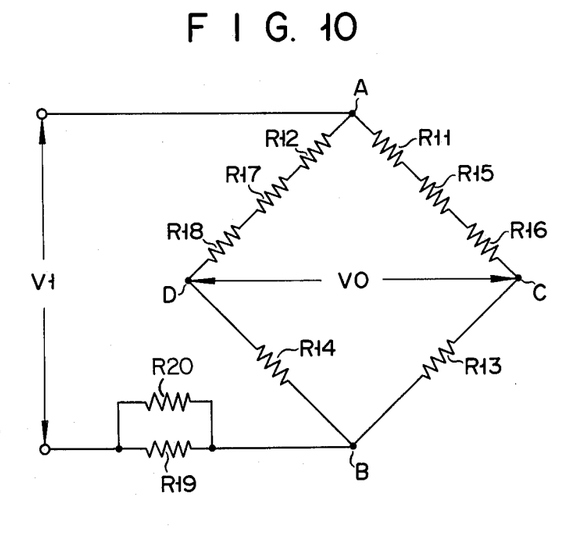
FIG. 10 is a circuit diagram showing an equivalent circuit of the load cell shown in FIG. 8.

The function of temperature compensation by the resistors 22-10 and 22-11 will now be described with reference to the equivalent circuit shown in FIG. 10. In the equivalent circuit, the resistors R11 and R20 correspond to the resistors 22-2 to 22-11 shown in FIG. 8.

Figure 11:
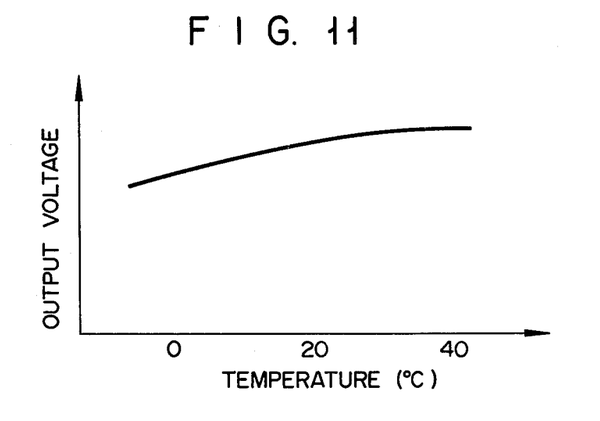
FIGS. 11 to 13 are graphs showing output voltage versus temperature characteristics.
Figure 12:
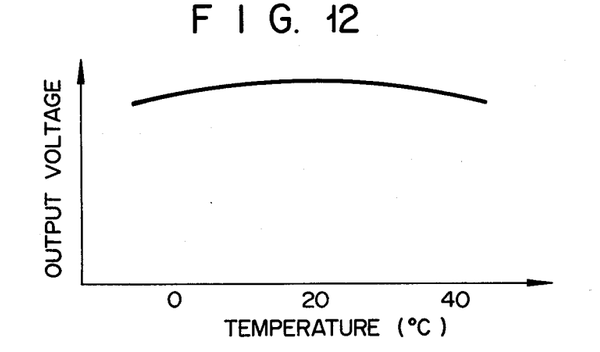

Now, assume that the beam body 20 is made of stainless steel (SUS630) and the strain gauge resistors 22-2 to 22-5 are made of Nichrome (Ni 40%, Cr 60%) such that their resistance is 3.0 kΩ and their temperature coefficient of resistance is +5 PPM/°C. The output voltage (span) of the bridge circuit gradually increases with temperature rise as shown in FIG. 11 if the temperature compensation resistor 22-10 and temperature characteristic compensation resistor 22-11, i.e., the resistors R19 and R20 in FIG. 10, are not used. For example, the output voltage at 40° C. is higher than the output voltage at 0° C. by about 0.7%. Next, suppose that the temperature compensation resistor 22-10 which is formed of the lamination of titanium and nichrome layers and has a resistance of 312 Ω and a temperature coefficient of resistance of +2,800 PPM/°C., is used for improving the span temperature characteristic. In this case, the output voltage VO is given as $$VO = \frac{R}{R + R19} \times VI \times K \times E \quad (1)$$

where R is the compound resistance of the bridge circuit, and K is the gauge factor of the strain gauge resistors 22-2 and 22-5 and have a value of 1.79 in case of nichrome (Ni 40%, Cr 60%). E represents the strain generated in the beam body 20 according to the load.

In this example, the output voltage has substantially the same value at 0° C. and at 40° C., and is slightly increased in the neighborhood of 20° C. The voltage variation in the neighborhood of 20° C. is, however, about 0.03%. Thus, the span temperature is widely improved.

Now, assume that the temperature characteristic compensation resistor 22-11 which is made of nichrome (Ni 40%, Cr 60%) and has a resistance of 1.952 kΩ and a small temperature coefficient of resistance like the strain gauge resistors 22-22 and 22-5, is used for improving the non-linearity of the span temperature characteristic.

In this case, the output voltage VO is given as follows:

$$VO = \frac{R}{R + \frac{R19 \cdot R20}{R19 + R20}} \times VI \times K \times E \quad (2)$$

Figure 13:
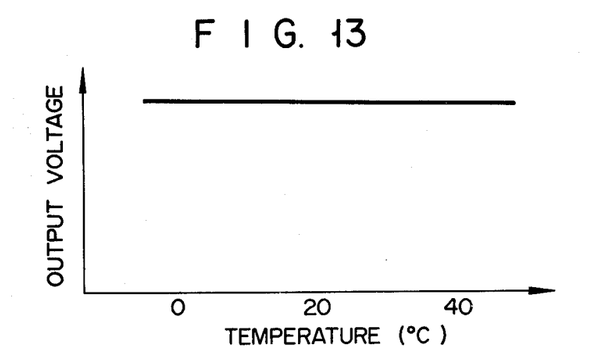

By using the temperature compensation resistor R19 and temperature characteristic compensation resistor R20 in this way, a substantially flat span temperature characteristic over the actual operating temperature range as shown in FIG. 13 can be obtained.

Now, the case when the load cell shown in FIG. 8 is given a load so that an extension strain is generated in the resistors 22-2 and 22-5 to increase the resistance thereof respectively by ΔR11 and ΔR14 and that a contractional strain is generated in the resistors 22-3 and 22-4 to reduce the resistance thereof respectively by ΔR12 and ΔR13 will be considered. In this case, the output voltage VO is given as follows:

$$VO = \frac{R}{R + \frac{R19 \cdot R20}{R19 + R20}} \times VI \times \frac{1}{4} \left( \frac{\Delta R11}{R11 + R15 + R16} + \frac{\Delta R12}{R12 + R17 + R18} + \frac{\Delta R13}{R13} + \frac{\Delta R14}{R14} \right) \quad (3)$$

Assuming that the resistors 22-2 and 22-5 have an equal resistance RO sufficiently higher than the sum of the resistance of the resistors 22-6 and 22-7 and that the resistors 22-3 has a resistance sufficiently higher than the sum of the resistances of the resistors 22-8 and 22-9, the equation (3) is rewritten as follows:

$$VO = \frac{R}{R + \frac{R19 \cdot R20}{R19 + R20}} \times VI \times \frac{\Delta RO}{RO} \quad (4)$$

where ΔRO is a change in resistance produced in the resistors 22-2 to 22-5 due to the strain according to the load.

Generally, there holds a relation ΔRO/RO=k·E. Substituting this equation into the equation (4), the following equation is obtained $$VO = \frac{R}{R + \frac{R19 \cdot R20}{R19 + R20}} \times VI \times K \times E \quad (5)$$

Since the strain E changes according to the load impressed upon the load cell, the output voltage VO changes according to the load. Since the strain E and gauge factor K change with temperature change, the output voltage changes with temperature change. The change in the output voltage with temperature change can be suppressed to a minimum by appropriately setting the resistances of the temperature compensating resistor R19 and temperature characteristic compensting resistor R20 to proper values on the basis of measurement data.

The method of manufacture of the load cell shown in FIG. 8 will be described with reference to FIGS. 14A and 14B.

First, the pattern formation surface of the beam body 20 having the through holes 20-1 to 20-6 as shown in FIG. 8, is made smooth to have a flat surface. Then, the pattern formation surface is rinsed to remove fat, and varnish-like polyimide resin with a viscosity of 1,000 cp is dripped on the clean pattern formation surface. The beam body 20 is then rotated with a spinner at a speed of about 1,600 rpm to uniformly coat the polyimide resin on the pattern formation surface. Subsequently, the beam body 20 is heated at 100° C. for one hour, then at 250° C. for one hour and then at 350° C. for one hour, thereby forming a polyimide resin film 22-1 with a thickness of 4 to 5μ on the pattern formation surface of the beam body 20 as shown in FIG. 14A. A 500-Å nichrome (Ni 40%, Cr 60%) layer 30 is then formed by means of sputtering on the polyimide film 22-1. As the conditions for the sputtering, the initial vacuum degree may be set to $3 \times 10^{-6}$ Torr, the argon pressure to $8 \times 10^{-3}$ Torr, the radio frequency output to 1.0 kW and the ambient temperature to 25° C.

Thereafter, a titanium layer 32 is formed by sputtering to a thickness of 2,000 Å on the nichrome layer 30, and then a gold layer 34 is formed by sputtering to a thickness of 1μ on the titanium layer 32. The conditions of the sputtering of titanium and gold may be set to be the same as for the sputtering of nichrome.

Afterwards, a pattern formation process by photo-etching method is carried out, which will now be described. First, a pattern corresponding to the resistors 22-2 to 22-11 and conductive layers connecting these resistors is formed by forming a photo-resist film on the gold layer 34 shown in FIG. 14A. Then, the gold layer 34 is selectively etched by using an etchant for gold, i.e., an iodide etchant. Subsequently, the titanium layer 32 is selectively etched by using an etchant for titanium, i.e., a fluoride etchant. Finally, the nichrome layer 30 is selectively etched by using an etchant for nichrome, i.e., a cerric ammonium nitrate etchant, thus obtaining a three-layer structure formed of the nichrome layer 30, titanium layer 32 and gold layer 34 having a pattern shown in FIG. 14B.

Figure 14A:
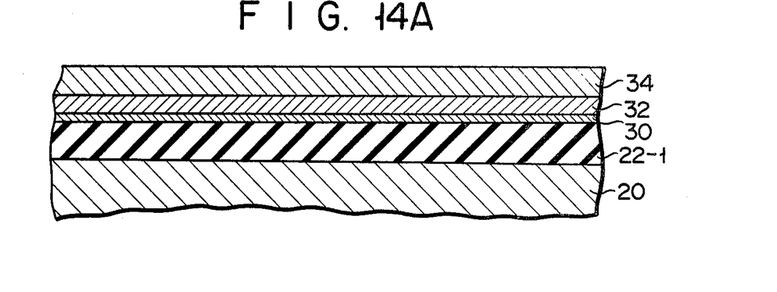
FIGS. 14A to 14G are sectional views illustrating a method of manufacture of the load cell shown in FIG. 8.
Figure 14B:
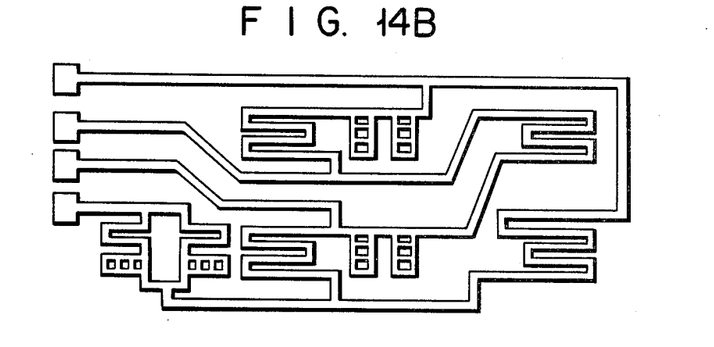
Figure 14C:
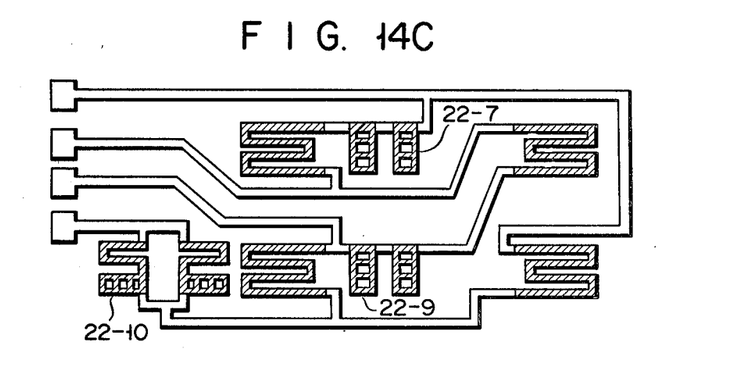

Then, the gold layer is selectively etched to leave the conductive layers connecting the resistors 22-2 to 22-11 as shown in FIG. 14C. That is, the shaded portions of the gold layer shown in FIG. 14C are etched out to expose the corresponding intermediate titanium layer. Thus, the gold conductive layer pattern and temperature compensation resistors 22-7, 22-9 and 22-10 are completed.

Figure 14D:
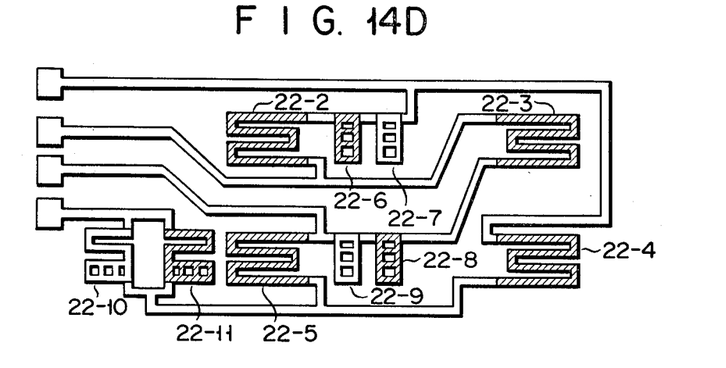

Subsequentialy, the exposed titanium layer in FIG. 14C is selectively etched to expose portions of the nichrome layer other than the portions in the region of the resistors 22-7, 22-9 and 22-10. That is, shaded portions of titanium layer shown in FIG. 14D are etched out to expose the nichrome layer in the shaded regions. Thus, the strain gauge resistors 22-2 to 22-5, bridge balancing resistors 22-6 and 22-8 and temperature characteristic compensation resistor 22-11 are completed. After the end of this step, bridge balancing test and temperature test are conducted, and the resistances of the resistors 22-6 and 22-8 are adjusted according to the results of tests.

Then, a polyimide insulating film 36, for instance, is formed on the pattern region obtained in the step of FIG. 14D. For the formation of the polyimide insulating film, varnish polyimide region with a viscosity of about 1,000 cp is dripped onto the pattern region and then the beam body 20 is rotated with a spinner at a speed of 1,400 rpm, thereby uniformly coating the polyimide layer on the pattern region. Then, the polyimide layer is dried at 100° C. for one hour, and is then hardened by heat treatment at 250° C. for one hour.

Figure 14E:
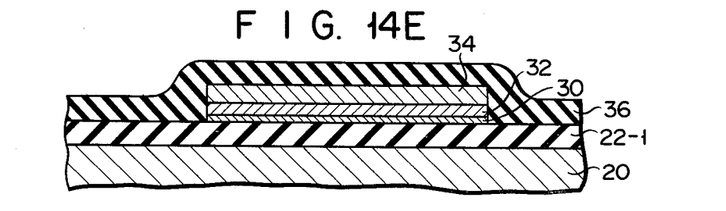
Figure 14F:
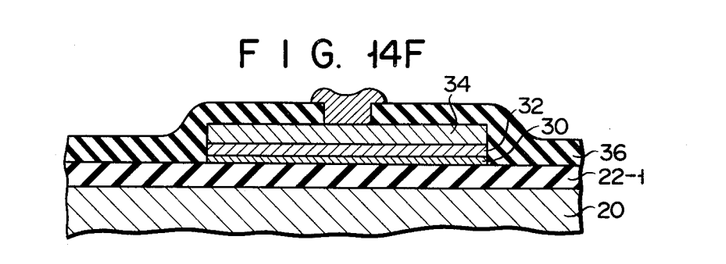

Thereafter, for the formation of the electrodes for connecting the power source lines or output lines thereto, the corresponding portions of the polyimide film are selectively photo-etched as shown in FIG. 14F, followed by heat treatment at about 350° C. to completely harden the polyimide film.

Figure 14G:
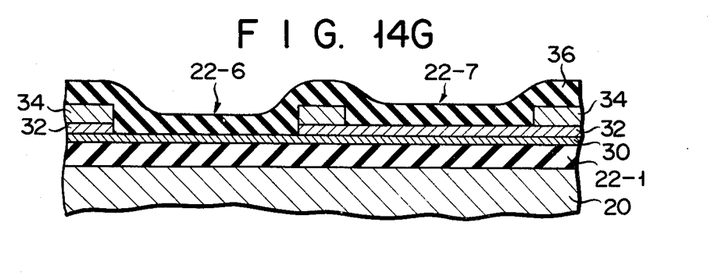

FIG. 14G shows a sectional view of the region including the bridge balancing resistor 22-6, temperature compensating resistor 22-7 and a conductive layer connecting both the resistors. As is shown, the conductive layer is constituted by the nichrome layer, titanium layer and gold layer, the temperature compensation resistor 22-7 is constituted by the nichrome layer and titanium layer, and the bridge balancing resistor 22-6 is constituted by the nichrome layer.

Figure 15A:
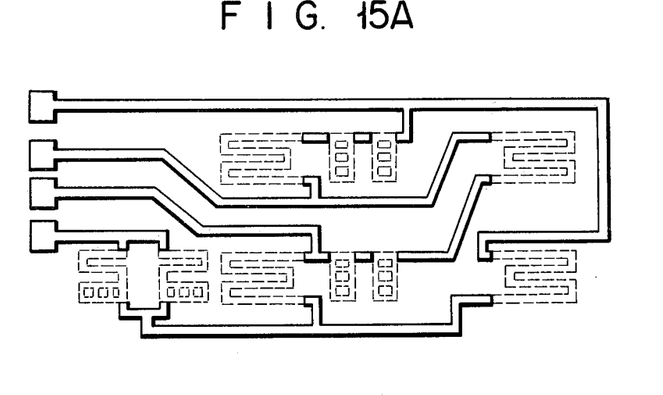
FIGS. 15A and 15B are views illustrating a method of manufacture of the load cell shown in FIG. 8.
Figure 15B:
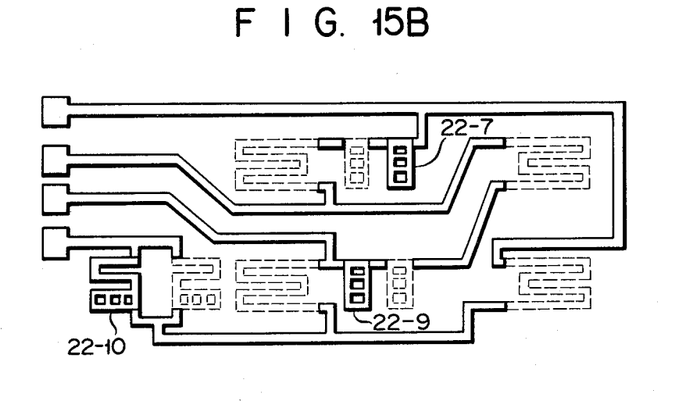

FIGS. 15A and 15B show the method of manufacture of a load cell different from that shown in FIGS. 14A to 14G. After forming a lamination structure formed of nichrome layer 30, titanium layer 32 and gold layer 34 as shown in FIG. 14A, the gold layer 34 is selectively etched to leave the shaded portions in FIG. 15A connecting the regions where the resistors 22-2 to 22-11 are formed.

Then, the titanium layer is selectively etched to leave its portions corresponding to the resistors 22-7, 22-9 and 22-10 and its portions underlying the conductive layers formed in the step of FIG. 15A, as shown in FIG. 15B. Afterwards, selective etching is effected to leave portions of the nichrome layer underlying the remaining titanium layer shown in FIG. 15B and portions of the nichrome layer corresponding to the resistors 22-2 to 22-6, 22-8 and 22-11. The manufacture is then carried out in the same manner as in the steps shown in FIGS. 14E and 14G.

While the invention has been described in connection with embodiments thereof, this invention is not limited thereto but is applicable in various modifications without departing from the technical scope of the invention. For example, in the example shown in FIGS. 8 and 9, the first and second resistive layers and conductive layer are respectively formed of nichrome, titanium and gold so that they can be selectively etched using different etchants. However, it is also possible to use nichrome, nickel and aluminum to respectively form the first and second resistive layers and conductive layer in order to attain the same effect.

What we claim is:

1. A load cell comprising:
    a beam body;
    a coating film of heat-resistant insulating resin formed on one surface of said beam body, said coating film having a substantially flat surface; and
    a load cell element formed on said substantially flat surface of said coating film;
    said load cell element including first and second power source terminals, first and second output terminals, a first strain gauge resistor and a first bridge balancing resistor connected in series between said first power source terminal and said first output terminal, a second strain gauge resistor and a second bridge balancing resistor connected in series between said first power source terminal and said second output terminal, a third strain gauge resistor connected between said second power source terminal and said first output terminal, and a fourth strain gauge resistor connected between said second power source terminal and said second output terminal, wherein a resistive layer is formed over a pattern region including said first to fourth strain gauge resistors, said first and second bridge balancing resistors and connecting means for connecting these resistors, and a conductive layer is formed on said resistive layer over a pattern area of the connecting means.

2. A load cell according to claim 1, wherein said resistive layer is formed of nichrome.

3. A load cell according to claim 1, wherein said first and second bridge balancing resistors each include at least one ladder-type resistive element.

4. A load cell according to claim 1, 2 or 3, which further comprises a further coating film of heat-resistant insulating resin covering said load cell element.

5. A load cell comprising a beam body, an insulating film formed on one surface of the beam body and a load cell element formed on the insulating film, said load cell element including first and second power source terminals, first and second output terminals, a first strain gauge resistor and a first bridge balancing resistor connected in series between said first power source terminal and first output terminal, a second strain gauge resistor and a second bridge balancing resistor connected in series between said first power source terminal and second output terminal, a third strain gauge resistor connected between said second power source terminal and first output terminal, a fourth strain gauge resistor connected between said second power source terminal and second output terminal, and a first temperature compensating resistor connected to the power source terminal and having a positive temperature coefficient of resistance, wherein a first resistive layer is formed over a region including said first to fourth strain gauge resistors, first and second bridge balancing resistors, first temperature compensating resistor, and connecting means for connecting these resistors, a second resistive layer having a lower resistivity than the resistivity of said first resistive layer is formed on said first resistive layer over a pattern region including said first temperature compensating resistor and connecting means, and that a conductive layer is formed on said second resistive layer over a pattern region of said connecting means.

6. A load cell according to claim 5, which further comprises a second temperature compensating resistor connected in series with said first strain gauge resistor and first bridge resistor between said first power source terminal and first output terminal and having a positive temperature coefficient of resistance, and a third temperature compensating resistor connected in series with said second strain gauge resistor and second bridge balancing resistor between said first power source terminal and second output terminal and having a positive temperature coefficient of resistance, wherein said second and third temperature compensating resistors are constituted by the lamination of said first and second resistive layers.

7. A load cell according to claim 6, wherein said first to third temperature compensating resistors, and first and second bridge balancing resistors and each include at least one ladder-type resistor element.

8. A load cell according to claim 6 or 7, wherein said first and second resistive layers and conductive layer are respectively made of nichrome, titanium and gold.

9. A load cell according to claim 6 or 7, wherein said first and second resistive layers and conductive layer are respectively formed of nichrome, nickel and alminum.

10. A load cell according to any one of claims 5, 6 or 7, which further comprises a span adjustment resistor connected in parallel with said first temperature compensation resistor.

11. A load cell according to claim 10, wherein said first temperature compensating resistor, first and second bridge balancing resistors and span adjustment resistor each include at least one ladder-type resistor element.

12. A load cell according to claim 11, which further comprises an insulating film covering said load cell element.

13. A load cell according to claim 10, which further comprises an insulating film covering said load cell element.

14. A load cell according to any one of claims 5 or 7 which further comprises an insulating film covering said load cell element.

* * * * *